US009316353B2

(12) United States Patent
Lv et al.

(10) Patent No.: US 9,316,353 B2
(45) Date of Patent: Apr. 19, 2016

(54) POWER OUTPUT DISCHARGE CIRCUIT

(71) Applicant: Emerson Network Power, Energy Systems, North America, Inc., Warrenville, IL (US)

(72) Inventors: Huajun Lv, Xi'an (CN); Hongbo Zhang, Xi'an (CN); Jing Sun, Xi'an (CN)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 437 days.

(21) Appl. No.: 13/959,285

(22) Filed: Aug. 5, 2013

(65) Prior Publication Data
US 2014/0042830 A1 Feb. 13, 2014

(30) Foreign Application Priority Data

Aug. 9, 2012 (CN) .......................... 2012 1 0282507

(51) Int. Cl.
*F16P 1/00* (2006.01)
*G05B 9/02* (2006.01)
*H02M 1/32* (2007.01)

(52) U.S. Cl.
CPC ...... *F16P 1/00* (2013.01); *G05B 9/02* (2013.01); *H02M 1/32* (2013.01); *H02M 2001/322* (2013.01)

(58) Field of Classification Search
CPC .............. F16P 1/00; G05B 9/02; H02M 1/32; H02M 2001/322
USPC ......................................................... 307/326
See application file for complete search history.

*Primary Examiner* — Hal Kaplan
(74) *Attorney, Agent, or Firm* — Harness, Dickey & Pierce, P.L.C.

(57) ABSTRACT

The present invention relates to a power output discharge circuit including: an output filter module configured to receive and filter an input voltage and to output the filtered output voltage to a load; an output charge module configured to charge the output filter module when a power source module is plugged into a system cabinet; and an output discharge module configured to cooperate with the output charge module to discharge the output filter module when the power source module is pulled out of the system cabinet. With an implementation of the power output discharge circuit according to the invention, whether the power source module is pulled out of the system cabinet can be monitored in real time, and upon detecting the power source module being pulled out of the system cabinet, the output discharge module can be started rapidly, and the voltage across the output port can be lowered below a safety voltage in a very short period of time.

20 Claims, 9 Drawing Sheets

POWER OUTPUT DISCHARGE CIRCUIT

CROSS-REFERENCE TO RELATED APPLICATION

This application claims the benefit and priority of Chinese Patent Application No. 201210282507.1 filed Aug. 9, 2012. The entire disclosure of the above application is incorporated herein by reference.

FIELD OF THE INVENTION

The present invention relates to the field of power sources and in particular to a power output discharge circuit.

BACKGROUND OF THE INVENTION

There is a high output voltage of a high-voltage direct-current power source module to support on-line hot plugging. When the power source module is pulled out of a system cabinet, it takes dozens of seconds to several minutes for discharging due to a large capacitance of its port. During this period of time, an operator may suffer from an electric shock if he or she comes into contact with the output port of the power source module by accident. Consequently a solution is highly desirable for the ability to discharge the output port rapidly so as to safeguard the operator.

There are two existing solutions:

In a first solution, a fixed-resistance load is placed at the output port for discharging. Such a solution has the advantage of a simple circuit and the disadvantages of discharging the power source module even in normal operation by the placed fixed-resistance load to cause an unnecessary power waste and of occupancy of a large space by the discharge resistor with a large volume.

In a second solution, the capacitor of the output port is discharged by an auxiliary power source of the power source module. Such a solution has the advantage of dispensing with an extra power waste to have a high power utilization ratio and the disadvantage of excessive dependence of a discharge period of time upon power of the auxiliary power source to make it difficult to adjust the discharge period of time.

Thus there is a need of a power output discharge circuit with good flexibility, a small volume, strong adaptability and a high power utilization ratio.

SUMMARY OF THE INVENTION

A technical problem to be addressed by the invention is to provide a power output discharge circuit with good flexibility, a small volume, strong adaptability and a high power utilization ratio in view of the drawbacks of the power output discharge circuit in the prior art either with a low power utilization ratio and a large volume or with poor flexibility and the difficulty to adjust a discharge period of time.

In a technical solution by which the invention addresses the technical problem thereof, there is devised a power output discharge circuit including:

an output filter module configured to receive and filter an input voltage and to output the filtered output voltage to a load;

an output charge module configured to charge the output filter module when a power source module is plugged into a system cabinet; and an output discharge module configured to cooperate with the output charge module to discharge the output filter module when the power source module is pulled out of the system cabinet.

In the power output discharge circuit according to the invention, the output filter module includes a first capacitor, a second capacitor, a first inductor and a second inductor, and wherein the first capacitor has the anode connected with an input voltage, and the cathode grounded, the second capacitor has the anode connected with an output anode, and the cathode connected with an output cathode, the anode of the first capacitor is connected with the anode of the second capacitor through the first inductor, and the cathode of the first capacitor is connected with the cathode of the second capacitor through the second inductor.

In the power output discharge circuit according to the invention, the output charge module includes a first resistor, and wherein the first resistor is connected between a hot plugging port and a positive output port of the output filter module, or the first resistor is connected between the hot plugging port and a negative output port of the output filter module.

In the power output discharge circuit according to the invention, the output charge module further includes a second resistor and a first diode, and wherein the first diode has the anode connected with the hot plugging port, and the cathode connected with the positive output port of the output filter module through the first resistor and the second resistor; or the first diode has the cathode connected with the hot plugging port, and the anode connected with the negative output port of the output filter module through the first resistor and the second resistor.

In the power output discharge circuit according to the invention, when the power source module is pulled out of the system cabinet, the output discharge module is configured to constitute a discharge loop together with the first resistor and the second resistor of the output charge module to discharge the first capacitor and the second capacitor in the output filter module.

In the power output discharge circuit according to the invention, the output discharge module includes:

a discharge switch unit configured to be turned on and to constitute a discharge loop together with the output charge module to discharge the output filter module when the power source module is pulled out of the system cabinet; and a discharge protection unit configured to protect the discharge switch unit when the discharge switch unit is turned on.

In the power output discharge circuit according to the invention, the discharge switch unit includes a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

In the power output discharge circuit according to the invention, the first input port is connected with a conducting port of the output charge module, the second input port is connected with the positive output port of the output filter module, the discharge protection unit includes a fourth resistor, a sixth resistor, a second diode, a third capacitor and a second switch tube, the second switch tube has a second terminal connected with the third terminal of the first switch tube, a first terminal grounded, and the third terminal connected with the anode of the third capacitor, the cathode of the third capacitor is grounded, the fourth resistor and the sixth resistor are connected in series between a hot plugging port and the ground, the third terminal of the second switch tube is connected with the point where the fourth resistor and the sixth resistor are connected, and the second diode has the anode grounded, and the cathode connected with the second terminal of the second switch tube; and the second switch tube is a triode, a transistor or a metal oxide semiconductor tube; and when the second switch tube is a triode, the first terminal of the second switch tube is an emitter of the triode, the second terminal of the second switch tube is the collector of the triode, and the third terminal of the second switch tube is the base of the triode; and when the second switch tube is a transistor or a metal oxide semiconductor tube, the first terminal of the second switch tube is the drain of the transistor or the metal oxide semiconductor tube, the second terminal of the second switch tube is the source of the transistor or the metal oxide semiconductor tube, and the third terminal of the second switch tube is the gate of the transistor or the metal oxide semiconductor tube.

In the power output discharge circuit according to the invention, the discharge protection unit further includes a third diode and a short-circuit connector, and wherein the third diode has the anode connected with the cathode of the second diode and the third terminal of the first switch tube, and the cathode connected with a short-circuit port, and the short-circuit connector has a first terminal connected with the short-circuit port, and a second terminal grounded.

In the power output discharge circuit according to the invention, the first input port is connected with a conducting port of the output charge module, the second input port is connected with the positive output port of the output filter module, the discharge protection unit includes a second diode, a third diode and a short-circuit connector, and wherein the second diode has the anode grounded, and the cathode connected with the third terminal of the first switch tube and the anode of the third diode, the cathode of the third diode is connected with a short-circuit port, and the short-circuit connector has a first terminal connected with the short-circuit port, and a second terminal grounded.

In the power output discharge circuit according to the invention, both the first input port and the second input port of the discharge switch unit are connected with the positive output port of the output filter module, the discharge protection unit includes a sixth resistor, a fourth resistor, a second diode, a third diode, a third capacitor and a second switch tube, the second switch tube has a second terminal connected with the third terminal of the first switch tube, a first terminal grounded, and a third terminal connected with the anode of the third capacitor, the cathode of the third capacitor is grounded, the sixth resistor and the fourth resistor are connected in series between the positive output port of the output filter module and the ground, the third terminal of the second switch tube is connected with the point where the sixth resistor and the fourth resistor are connected, the second diode has the anode grounded, and the cathode connected with the third terminal of the first switch tube and the anode of the third diode, and the cathode of the third diode is connected with the a short-circuit port.

With an implementation of the power output discharge circuit according to the invention, whether the power source module is pulled out of the system cabinet can be monitored in real time, and upon detecting the power source module being pulled out of the system cabinet, the output discharge module can be started rapidly, and the voltage across the output port can be lowered below a safety voltage in a very short period of time.

BRIEF DESCRIPTION OF THE DRAWINGS

The invention will be further described below with reference to the drawings and embodiments thereof. In the drawings.

DETAILED DESCRIPTION OF THE INVENTION

Figure 1:
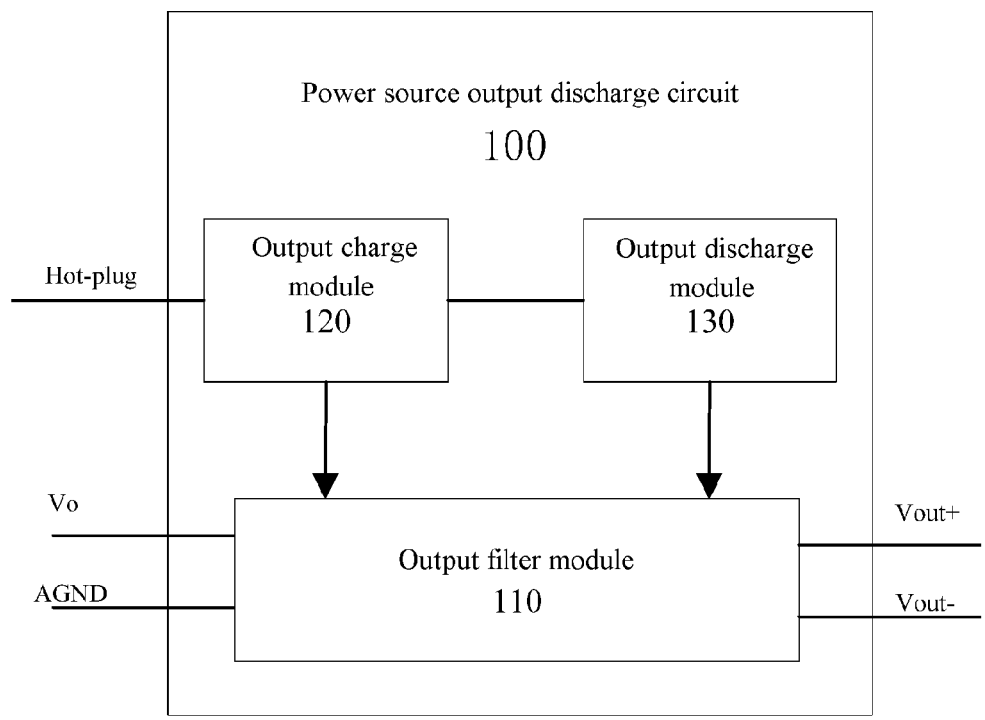
FIG. 1 is a schematic block diagram of a first embodiment of a power output discharge circuit according to the invention.

FIG. 1 is a principle block diagram of a first embodiment of a power output discharge circuit according to the invention. As illustrated in FIG. 1, the power output discharge circuit 100 according to the invention includes an output filter module 110, an output charge module 120 and an output discharge module 130. The power output discharge circuit according to the invention can be fabricated as an integrated circuit structure, a module or a circuit attached to a power source module or can be integrated into the power source module. In the embodiment illustrated in FIG. 1, when the power source module is plugged into a system cabinet, the power source module operates normally, and the output filter module 110 receives an input voltage from between an input voltage Vo and the ground AGND and subsequently filters the input voltage and then outputs the filtered output voltage to a load across an output anode Vout+ and an output cathode Vout−. At this time the output charge module 120 charges the output filter module 110 by a bus bar voltage received from a hot plugging port Hot-Plug. When the power source module is pulled out of the system cabinet, there is a high voltage across the output anode Vout+ and the output cathode Vout−. At this time the output discharge module 130 cooperates with the output charge module 120 to discharge the output anode Vout+ and the output cathode Vout− of the output filter module 110.

As known to those skilled in the art, the output filter module 110 and the output charge module 120 can be any module, circuit or device construction known in the prior art. For example, the output filter module 110 can be any filter LC module or LRC module. The output filter module 110 can alternatively include any other known rectifier bridge or rectifier module. The output charge module 120 can be any power supply circuit, e.g., a purely resistive circuit, i.e., a single resistor or two or more resistors connected in series or parallel. In light of the teaching of the invention, those skilled in the art can derive and fabricate a variety of the output filter module 110, the output charge module 120 and the output discharge module 130.

With an implementation of the power output discharge circuit according to the invention, whether the power source module is pulled out of the system cabinet can be monitored in real time, and upon detecting the power source module being pulled out of the system cabinet, the output discharge module can be started rapidly, and the voltage across the output port can be lowered below a safety voltage in a very short period of time.

Figure 2:
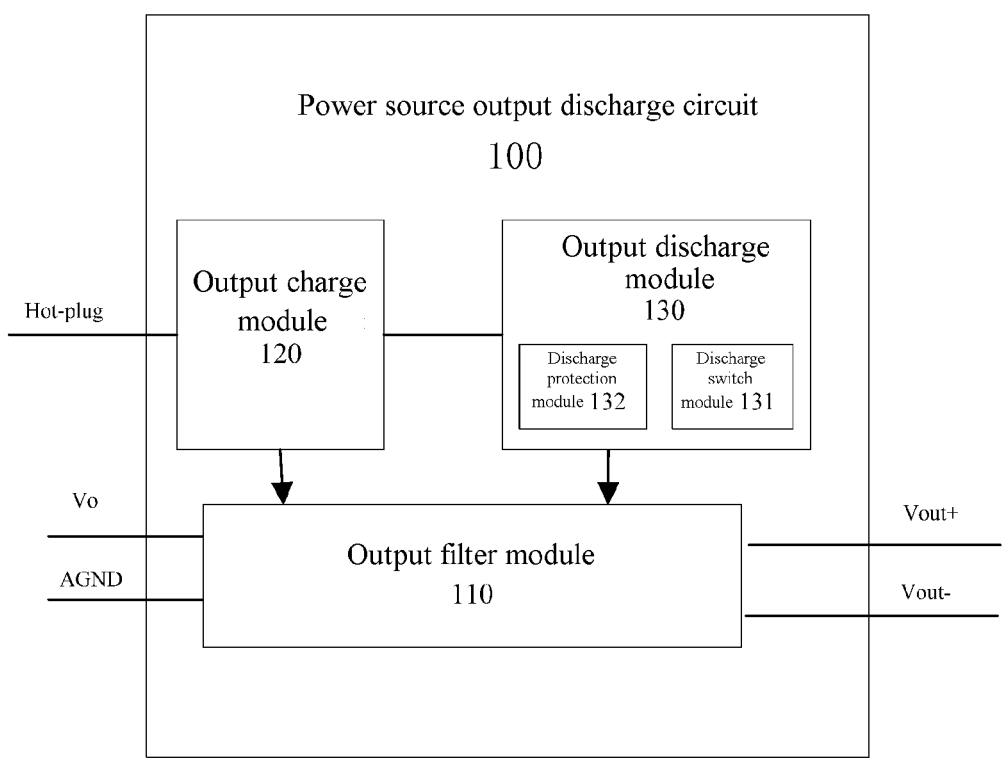
FIG. 2 is a schematic block diagram of a further embodiment of a power output discharge circuit according to the invention.

FIG. 2 is a principle block diagram of a further embodiment of a power output discharge circuit according to the invention. As illustrated in FIG. 2, the power output discharge circuit 100 according to the invention includes an output filter module 110, an output charge module 120 and an output discharge module 130, where the output discharge module 130 includes a discharge switch unit 131 and a discharge protection unit 132. Particularly when the power source module is pulled from the system cabinet, the discharge switch unit 131 is configured to constitute a discharge loop together with the output charge module 120 to discharge the output filter module 110. The discharge protection unit 132 is configured to protect the discharge switch unit 131 when the discharge switch unit 131 is turned on. FIG. 3 to FIG. 9 illustrate respective implementations of the discharge switch unit 131 and the discharge protection unit 132 respectively. As known to those skilled in the art, those skilled in the art can build other discharge switch unit 131 and the discharge protection unit 132 in addition to the illustrated embodiments of the invention in light of the teaching of the invention.

Figure 3:
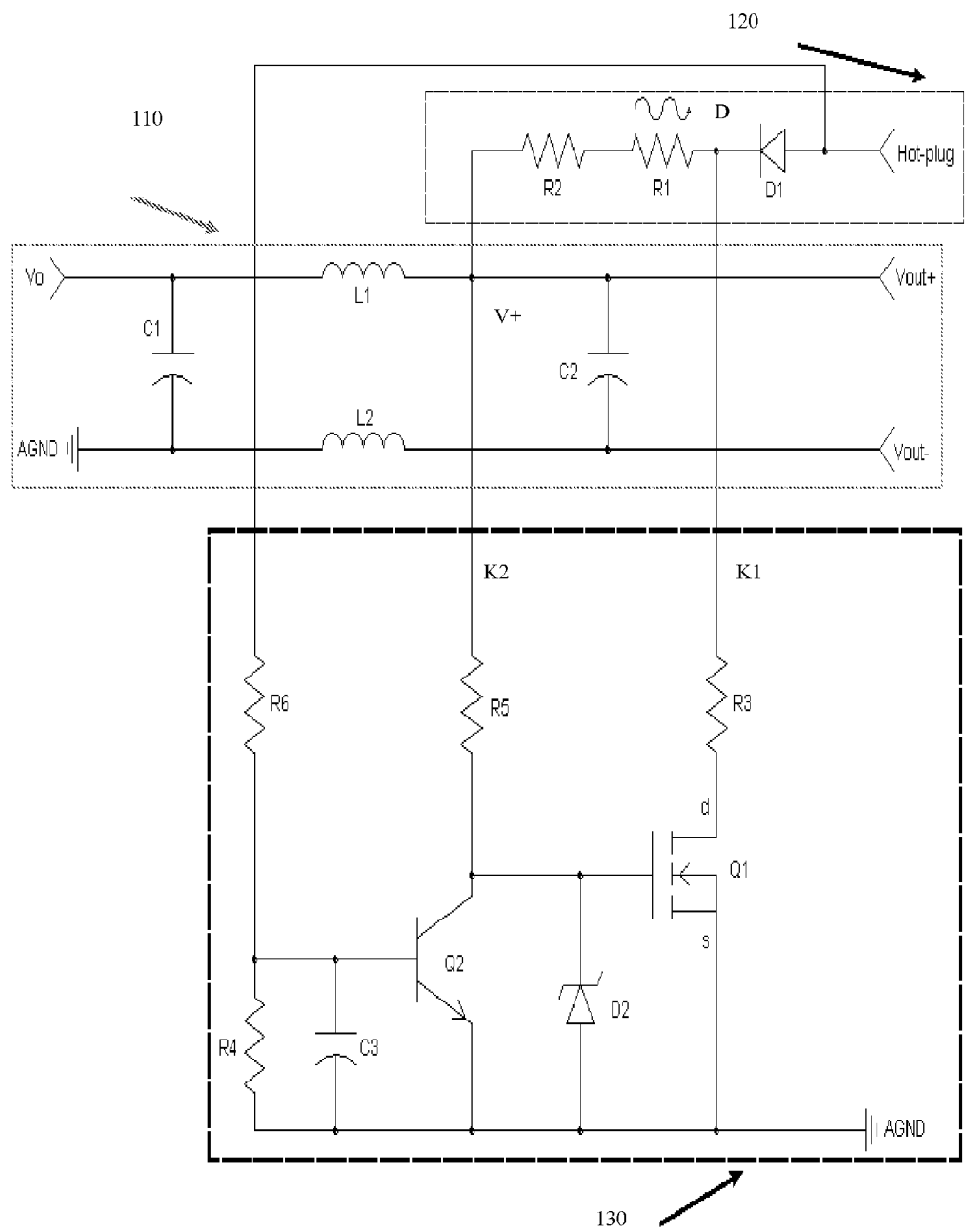
FIG. 3 is a schematic circuit diagram of a second embodiment of a power output discharge circuit according to the invention.

FIG. 3 is a schematic circuit diagram of a second embodiment of a power output discharge circuit according to the invention. As illustrated in FIG. 3, the power output discharge circuit 100 according to the invention includes an output filter module 110, an output charge module 120 and an output discharge module 130.

As illustrated in FIG. 3, the output filter module 110 can include a capacitor C1, a capacitor C2, an inductor L1 and an inductor L2, where the capacitor C1 has the anode connected with an input voltage Vo, and the cathode connected with the ground AGND. The capacitor C2 has the anode connected with an output anode Vout+, and the cathode connected with an output cathode Vout−. The anode of the capacitor C1 is connected with the anode of the capacitor C2 through the inductor L1, and the cathode of the capacitor C1 is connected with the cathode of the capacitor C2 through the inductor L2. As known to those skilled in the art, the output filter module 110 can further include a rectifier bridge, a filter and rectifier resistor, etc., in other embodiments of the invention.

The output charge module 120 can include a resistor R1, a resistor R2 and a diode D1, where the diode D1 has the anode connected with the hot plugging port Hot-plug, and the cathode connected with the positive output port V+ of the output filter module 110 through the resistor R1 and the resistor R2. As known to those skilled in the art, the resistors R1 and R2 can be replaced with a larger-resistance resistor or a plurality of smaller-resistance resistors, or, the resistors R1 and R2 can be adjustable in resistance, in some embodiments of the invention. In some embodiments of the invention, for example, in a scenario without the possibility of reverse voltage irrigation occurring, the diode D1 can be omitted. In this embodiment, the resistors R1 and R2 can be discharge resistors, thermistors, adjustable resistors, etc.

In this embodiment, when the power source module is pulled out of the system cabinet, the output discharge module 130 is configured to constitute a discharge loop together with the resistors R1-R2 of the output charge module 120 to discharge the capacitor C1 and the capacitor C2 in the output filter module 110. In this embodiment, the output discharge module 130 can include a resistor R3, a resistor R4, a resistor R5, a resistor R6, a diode D2, a capacitor C3, a switch tube Q1 and a switch tube Q2, where the resistor R3, the resistor R5 and the switch tube Q1 constitute a discharge switch unit 131, and the resistor R4, the resistor R6, the diode D2, the capacitor C3 and the switch tube Q2 constitute a discharge protection unit 132.

Particularly the switch tube Q1 has a first terminal connected with a first input port K1 of the discharge switch unit 131 through the resistor R3, a second terminal grounded, and a third terminal connected with a second input port K2 of the discharge switch unit 131 through the resistor R5. The switch tube Q1 can be a triode, a transistor or a metal oxide semiconductor tube. When the switch tube Q1 is a triode, the first terminal of the switch tube Q1 is an emitter of the triode, the second terminal of the switch tube Q1 is the collector of the triode, and the third terminal of the switch tube Q1 is the base of the triode; and when the switch tube Q1 is a transistor or a metal oxide semiconductor tube, the first terminal of the switch tube Q1 is the drain of the transistor or the metal oxide semiconductor tube, the second terminal of the switch tube Q1 is the source of the transistor or the metal oxide semiconductor tube, and the third terminal of the switch tube Q1 is the gate of the transistor or the metal oxide semiconductor tube.

Particularly the switch tube Q2 has a second terminal connected with the third terminal of the first switch tube, a first terminal grounded, and a third terminal connected with the anode of the capacitor C3, the cathode of the capacitor C3 is grounded, and the resistor R4 and the resistor R6 are connected in series between the hot plugging port Hot-plug and the ground GND. The third terminal of the switch tube Q2 is connected with the point where the resistor R4 and the resistor R6 are connected. The diode D2 has the anode grounded, and the cathode connected with the second terminal of the switch tube Q2. The switch tube Q2 is a triode, a transistor or a metal oxide semiconductor tube. When the switch tube Q2 is a triode, the first terminal of the switch tube Q2 is an emitter of the triode, the second terminal of the switch tube Q2 is the collector of the triode, and the third terminal of the switch tube Q2 is the base of the triode; and when the switch tube Q2 is a transistor or a metal oxide semiconductor tube, the first terminal of the switch tube Q2 is the drain of the transistor or the metal oxide semiconductor tube, the second terminal of the switch tube Q2 is the source of the transistor or the metal oxide semiconductor tube, and the third terminal of the switch tube Q2 is the gate of the transistor or the metal oxide semiconductor tube.

In this embodiment, the switch tube Q1 is a metal oxide semiconductor tube Q1, and the switch tube Q2 is a triode Q2, where the drain of the metal oxide semiconductor tube Q1 is connected with the first input port K1 of the discharge switch unit 131 through the resistor R3, and the first input port K1 of the discharge switch unit 131 is connected with a conducting port D of the output charge module 120. In this embodiment, the conducting port D of the output charge module 120 is the cathode of the diode D1. The metal oxide semiconductor tube Q1 has the source grounded, and the gate connected with the cathode of the diode D2. The anode of the diode D2 is grounded. The triode Q2 has the collector connected with the second input port K2 of the discharge switch unit 131 through the resistor R5, the emitter grounded and the base connected with the anode of the capacitor C3, where the second input port K2 of the discharge switch unit 131 is connected with the positive output port V+ of the output filter module 110. The cathode of the capacitor C3 is grounded, the resistor R4 and the resistor R6 are connected in series between the hot plugging port Hot-plug and the ground AGND, and the base of the triode Q2 is connected with the point where the resistor R4 and the resistor R6 are connected. In other embodiments of the invention, the metal oxide semiconductor tube Q1 can be a transistor, e.g., an Insulated Gate Bipolar Transistor (IGBT), etc.; and in this embodiment, the resistor R3 can be a discharge resistor, a thermistor, an adjustable resistor, etc.

A principle of the power output discharge circuit according to the invention illustrated in FIG. 3 will be described briefly below. When the power source module is plugged into the system cabinet, the hot plugging port Hot-plug of the output charge module 120 will be connected with the positive bus bar. At this time the diode D1 is turned on, and a bus bar voltage is applied to the output anode V+ of the output filter module 110 through the resistors R1 and R2 to thereby charge the output filter module 110 through a first loop consisting of the diode D1, the resistors R1 and R2 and the capacitor C2 and a second loop consistings of the diode D1, the resistors R1 and R2, the inductors L1 and L2 and the capacitor C1. At this time the bus bar voltage is applied to the base of the triode Q2 through the resistors R6 and R4 to turn on the triode Q2 and to pull the voltage at the gate of the metal oxide semiconductor tube Q1 to zero. At this time the metal oxide semiconductor tube Q1 is turned off, and the discharge function of the output discharge module 130 is disabled. When the power source module is pulled out of the system cabinet, the hot plugging port Hot-plug of the output charge module 120 will be disconnected from the positive bus bar. At this time the triode Q2 is turned off, and voltages stored by the capacitor C1 and the capacitor C2 on the output anode V+ of the output filter module 110 are applied to the gate of the metal oxide semiconductor tube Q1 through the resistor R5. The metal oxide semiconductor tube Q1 is turned on to form two discharge loops. A first discharge loop includes the capacitor C1, the inductor L1, the resistor R2, the resistor R1, the resistor R3 and the metal oxide semiconductor tube Q1. A second discharge loop includes the capacitor C2, the inductor L2, the resistor R2, the resistor R1, the resistor R3 and the metal oxide semiconductor tube Q1. A discharging period of time can be adjusted by adjusting the resistor R2, the resistor R1, the resistor R3 in resistance.

Thus with an implementation of the power output discharge circuit according to the invention, whether the power source module is pulled out of the system cabinet can be monitored in real time, and upon detecting the power source module being pulled out of the system cabinet, the output discharge module 130 can be started rapidly, and the voltage across the output port can be lowered below a safety voltage in a very short period of time. And a discharging period of time can be adjusted by adjusting the discharge resistors in resistance.

Figure 4:
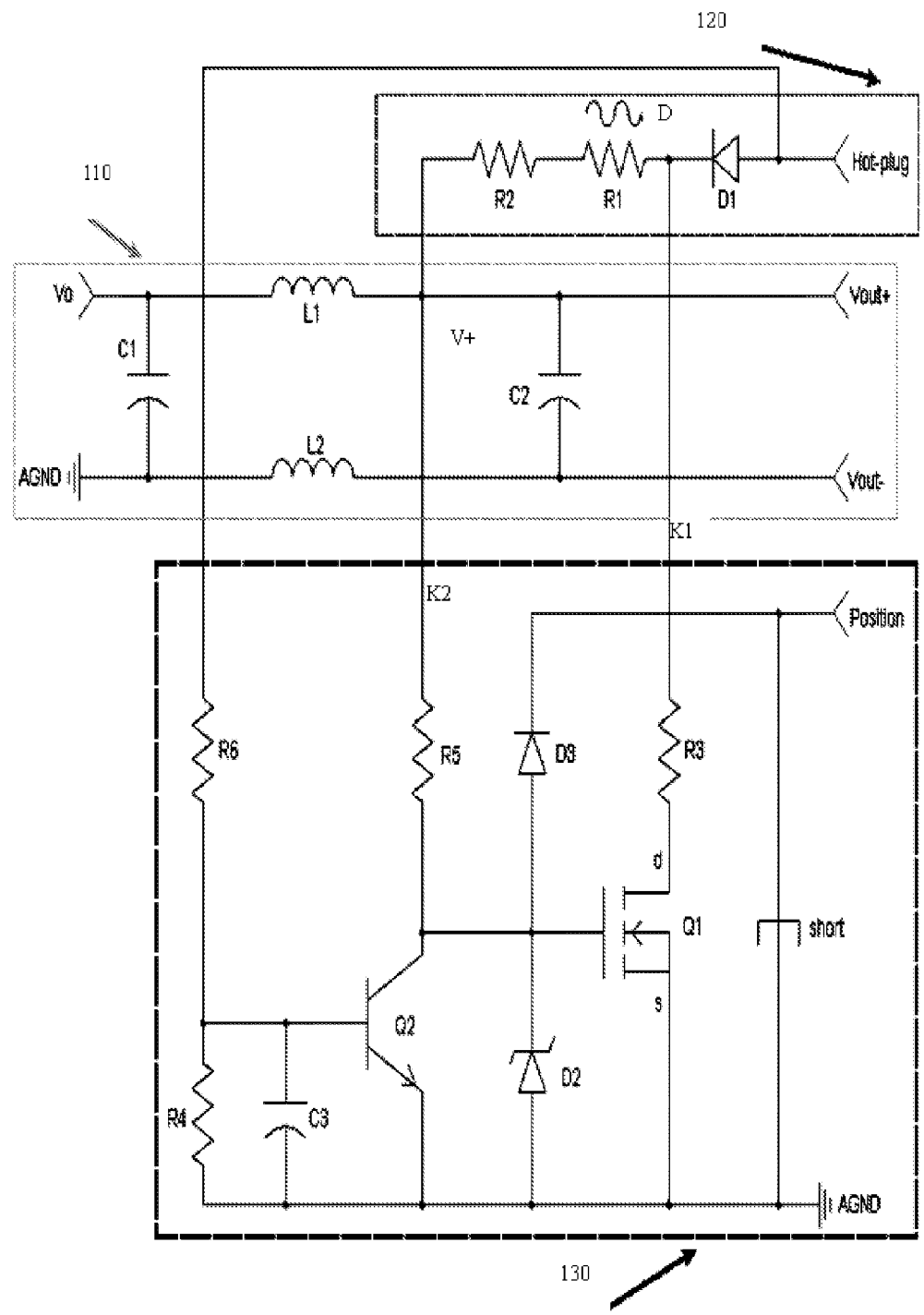
FIG. 4 is a schematic circuit diagram of a third embodiment of a power output discharge circuit according to the invention.

FIG. 4 is a schematic circuit diagram of a third embodiment of a power output discharge circuit according to the invention. As illustrated in FIG. 4, the power output discharge circuit 100 according to the invention includes an output filter module 110, an output charge module 120 and an output discharge module 130.

As illustrated in FIG. 4, the output filter module 110 can include a capacitor C1, a capacitor C2, an inductor L1 and an inductor L2, where the capacitor C1 has the anode connected with an input voltage Vo, and the cathode connected with the ground AGND. The capacitor C2 has the anode connected with an output anode Vout+, and the cathode connected with an output cathode Vout−. The anode of the capacitor C1 is connected with the anode of the capacitor C2 through the inductor L1, and the cathode of the capacitor C1 is connected with the cathode of the capacitor C2 through the inductor L2.

The output charge module 120 can include a resistor R1, a resistor R2 and a diode D1, where the diode D1 has the anode connected with the hot plugging port Hot-plug, and the cathode connected with the positive output port V+ of the output filter module 110 through the resistor R1 and the resistor R2.

In this embodiment, when the power source module is pulled out of the system cabinet, the output discharge module 130 is configured to constitute a discharge loop together with the resistors R1-R2 of the output charge module 120 to discharge the capacitor C1 and the capacitor C2 in the output filter module 110.

In this embodiment, the output discharge module 130 can include a resistor R3, a resistor R4, a resistor R5, a resistor R6, a diode D2, a capacitor C3, a switch tube Q1, a switch tube Q2, a diode D3 and a short-circuit connector Short, where the resistor R3, the resistor R5 and the switch tube Q1 constitute a discharge switch unit, and the resistor R4, the resistor R6, the diode D2, the capacitor C3, the switch tube Q2, the diode D3 and the short-circuit connector Short constitute a discharge protection unit.

Particularly the switch tube Q1 has a first terminal connected with a first input port K1 of the discharge switch unit 131 through the resistor R3, a second terminal grounded, and a third terminal connected with a second input port K2 of the discharge switch unit 131 through the resistor R5. The switch tube Q1 can be a triode, a transistor or a metal oxide semiconductor tube. When the switch tube Q1 is a triode, the first terminal of the switch tube Q1 is an emitter of the triode, the second terminal of the switch tube Q1 is the collector of the triode, and the third terminal of the switch tube Q1 is the base of the triode; and when the switch tube Q1 is a transistor or a metal oxide semiconductor tube, the first terminal of the switch tube Q1 is the drain of the transistor or the metal oxide semiconductor tube, the second terminal of the switch tube Q1 is the source of the transistor or the metal oxide semiconductor tube, and the third terminal of the switch tube Q1 is the gate of the transistor or the metal oxide semiconductor tube.

Particularly the switch tube Q2 has a second terminal connected with the third terminal of the first switch tube, a first terminal grounded, and a third terminal connected with the anode of the capacitor C3, the cathode of the capacitor C3 is grounded, and the resistor R4 and the resistor R6 are connected in series between the hot plugging port Hot-plug and the ground GND. The third terminal of the switch tube Q2 is connected with the point where the resistor R4 and the resistor R6 are connected. The diode D2 has the anode grounded, and the cathode connected with the second terminal of the switch tube Q2. The switch tube Q2 is a triode, a transistor or a metal oxide semiconductor tube. When the switch tube Q2 is a triode, the first terminal of the switch tube Q2 is an emitter of the triode, the second terminal of the switch tube Q2 is the collector of the triode, and the third terminal of the switch tube Q2 is the base of the triode; and when the switch tube Q2 is a transistor or a metal oxide semiconductor tube, the first terminal of the switch tube Q2 is the drain of the transistor or the metal oxide semiconductor tube, the second terminal of the switch tube Q2 is the source of the transistor or the metal oxide semiconductor tube, and the third terminal of the switch tube Q2 is the gate of the transistor or the metal oxide semiconductor tube.

In this embodiment, the switch tube Q1 is an IGBT tube Q1, and the switch tube Q2 is a triode Q2, where the drain of the IGBT tube Q1 is connected with the first input port K1 of the discharge switch unit 131 through the resistor R3. The first input port K1 of the discharge switch unit 131 is connected with a conducting port D of the output charge module 120. In this embodiment, the conducting port D of the output charge module 120 is the cathode of the diode D1. The IGBT tube Q1 has the source grounded, and the gate connected with the cathode of the diode D2. The anode of the diode D2 is grounded. The triode Q2 has the collector connected with the second input port K2 of the discharge switch unit 131 through the resistor R5, the emitter grounded and the base connected with the anode of the capacitor C3, where the second input port K2 of the discharge switch unit 131 is connected with the positive output port V+ of the output filter module 110. The cathode of the capacitor C3 is grounded, the resistor R4 and the resistor R6 are connected in series between the hot plugging port Hot-plug and the ground AGND, and the base of the triode D2 is connected with the point where the resistor R4 and the resistor R6 are connected. Particularly the diode D3 has the anode connected with the cathode of the diode D2 and the base of the IGBT Q1, and the cathode connected with a short-circuit port Position, and the short-circuit connector Short has a first terminal connected with the short-circuit port Position, and a second terminal grounded. As known to those skilled in the art, the short-circuit connector Short is any device capable of making the first terminal and the second terminal thereof shorted, e.g., an extremely-small-resistance wire, an extremely small resistor or other devices.

In this embodiment, the hot plugging port Hot-plug, the short-circuit port Position, the output anode Vout+ and the cathode connection output anode Vout− can be fabricated as length-varying needles. In this embodiment, the needle of the hot plugging port Hot-plug is slightly longer than the needle of the short-circuit port Position. Thus when the power source module is plugged into or pulled out of the system cabinet, the hot plugging port Hot-plug firstly comes into contact with a bus bar voltage or is disconnected from the bus bar.

Figure 5:
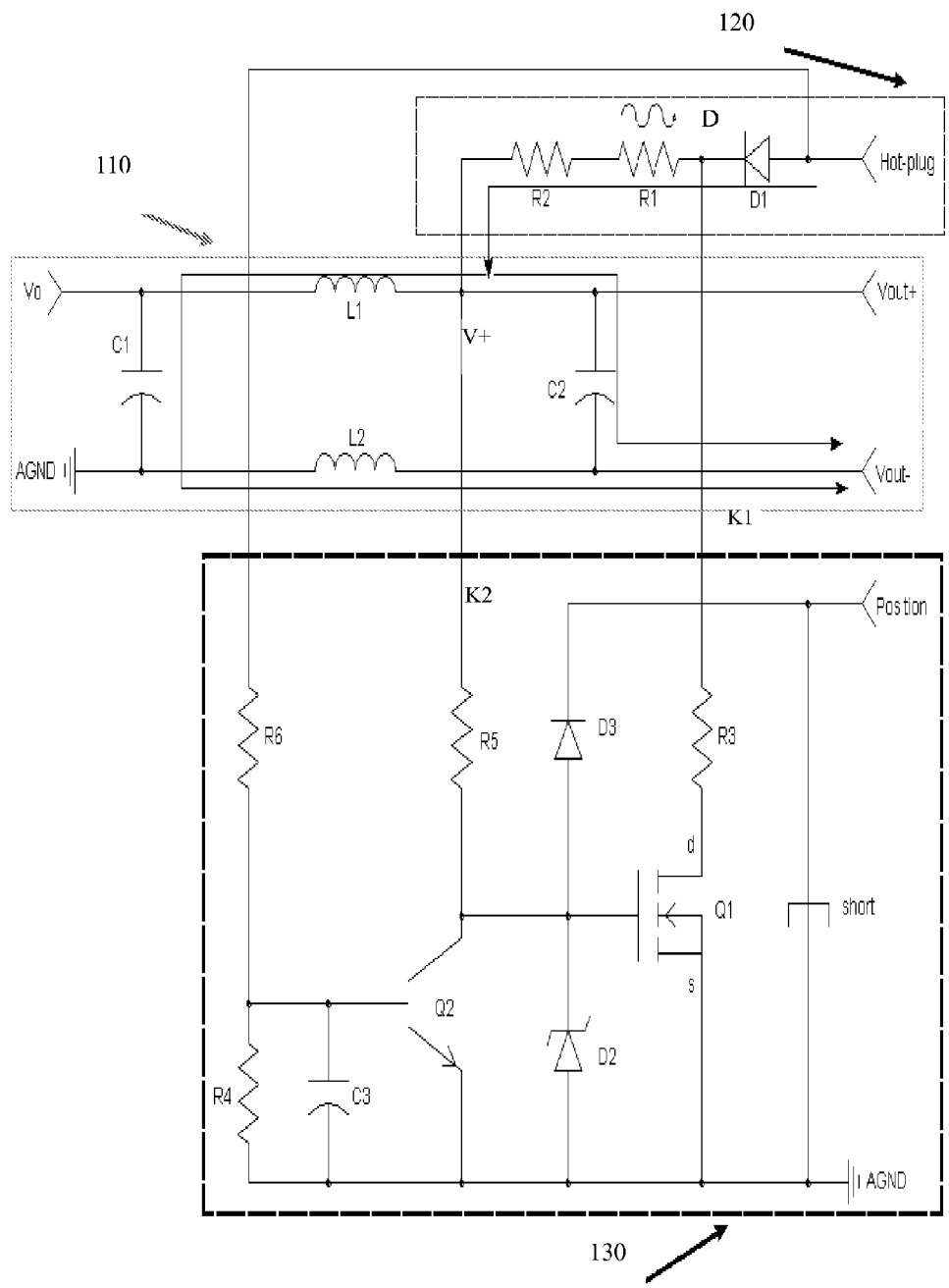
FIG. 5 is a schematic diagram of a circuit operation principle of the power output discharge circuit illustrated in FIG. 4 when the power source module is plugged into a system cabinet.
Figure 6:
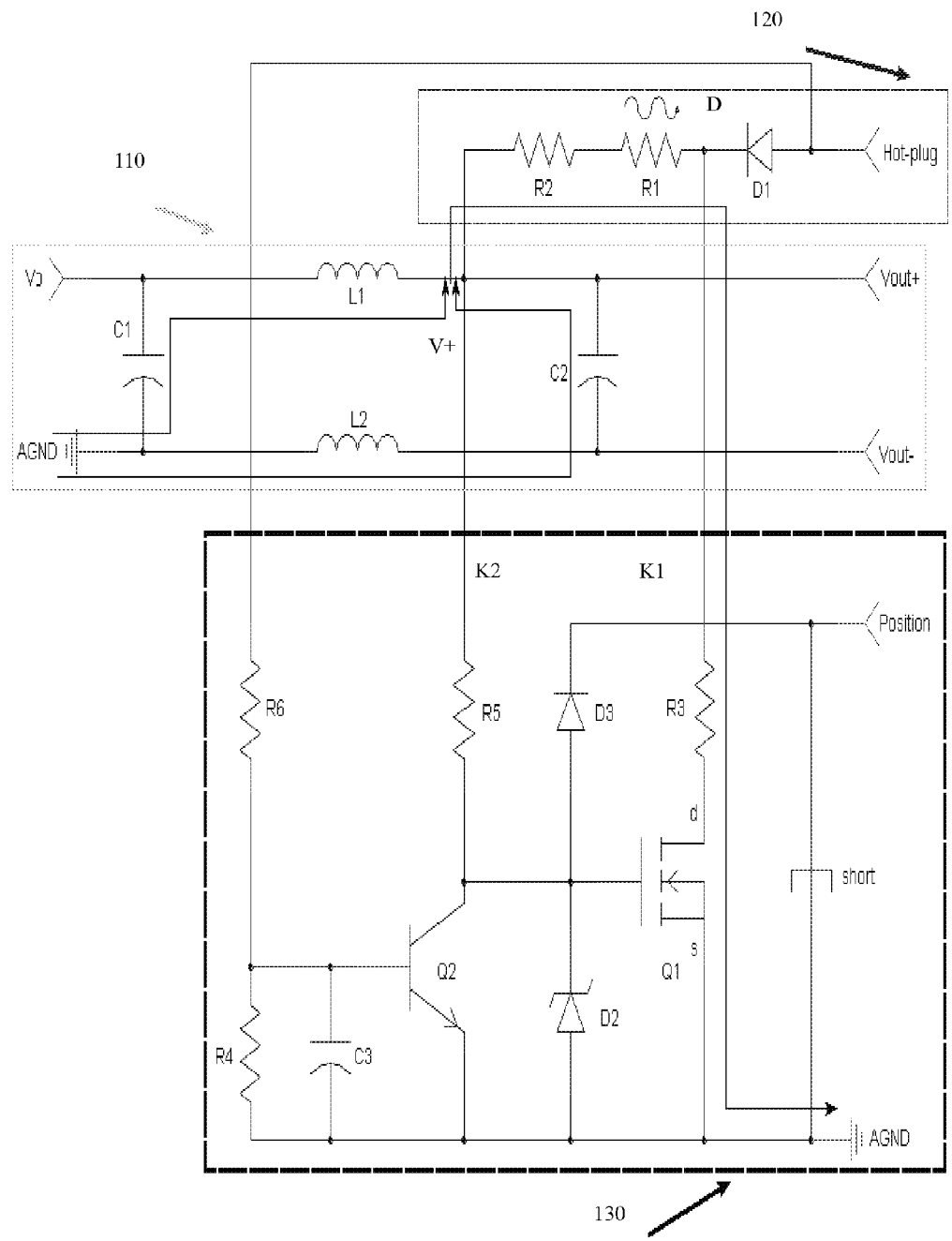
FIG. 6 is a schematic diagram of a circuit operation principle of the power output discharge circuit illustrated in FIG. 4 when the power source module is pulled out of the system cabinet.

FIG. 5 and FIG. 6 are schematic diagrams of circuit operation principles of the power output discharge circuit illustrated in FIG. 4 when the power source module is plugged into the system cabinet and when the power source module is pulled out of the system cabinet. Now referring to FIG. 5 to FIG. 6, an operation principle of the power output discharge circuit illustrated in FIG. 4 will be described below.

In this embodiment, when the power source module is plugged into the system cabinet, since the needle of the hot plugging port Hot-plug is slightly longer than the needle of the short-circuit port Position, the hot plugging port Hot-plug of the output charge module 120 will firstly be connected with the positive bus bar. The diode D1 is turned on, and a bus bar voltage is applied to the output anode V+ of the output filter module 110 through the resistors R1 and R2 to thereby charge the output filter module 110 through a first loop consisting of the diode D1, the resistors R1 and R2 and the capacitor C2 and a second loop consisting of the diode D1, the resistors R1 and R2, the inductors L1 and L2 and the capacitor C1. At this time the bus bar voltage is applied to the base of the triode Q2 through the resistors R6 and R4 to turn on the triode Q2 and to pull the voltage at the gate of the IGBT tube Q1 to zero. At this time the IGBT tube Q1 is turned off, and the discharge function of the output discharge module 130 is disabled. Later the short-circuit port Position is plugged into the system cabinet, and at this time the short-circuit connector Short makes the short-circuit port Position and the control ground AGND shorted, and at this time the gate of the IGBT Q1 is forcibly pulled down by the diode D3 to zero so that the IGBT Q1 will stay in an OFF status all the time to thereby disable entirely the discharge function of the output discharge module 130 without any power consumption. As illustrated in FIG. 4, the bus bar voltage is further applied to the output anode V+ of the output filter module 110 through the resistors R1 and R2 to thereby charge the output filter module 110 through the first loop consisting of the diode D1, the resistors R1 and R2 and the capacitor C2 and the second loop consisting of the diode D1, the resistors R1 and R2, the inductors L1 and L2 and the capacitor C1.

When the power source module is pulled out of the system cabinet, the hot plugging port Hot-plug of the output charge module 120 will be disconnected from the positive bus bar. The short-circuit port Position and the control ground AGND will also be disconnected. At this time the triode Q2 is turned off, and the diode D3 is also turned from ON to OFF. Voltages stored by the capacitor C1 and the capacitor C2 on the output anode V+ of the output filter module 110 are applied to the gate of the IGBT tube Q1 through the resistor R5 to turn on the IGBT tube Q1, thereby forming two discharge loops. As illustrated in FIG. 5, a first discharge loop includes the capacitor C1, the inductor L1, the resistor R2, the resistor R1, the resistor R3 and the IGBT Q1. A second discharge loop includes the capacitor C2, the inductor L2, the resistor R2, the resistor R1, the resistor R3 and the IGBT Q1. A discharging period of time can be adjusted by adjusting the resistor R2, the resistor R1, the resistor R3 in resistance. In this process, the triode Q2 clamps the voltage at the gate of the IGBT Q1 within a specific range for possible rapider protection of the IGBT Q1.

Figure 7:
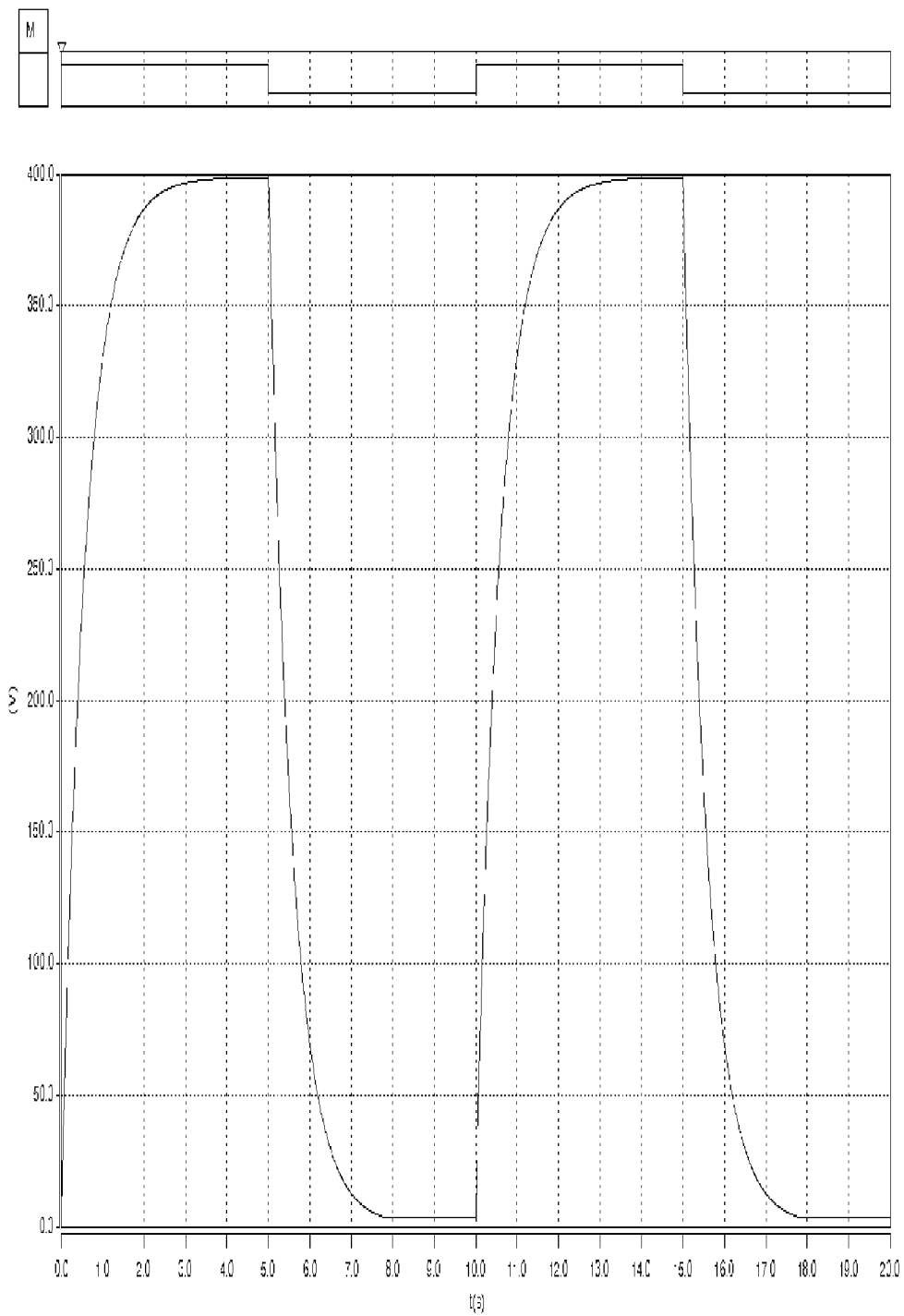
FIG. 7 is a schematic diagram of charging and discharging of the power output discharge circuit illustrated in FIG. 4 when the power source module is plugged into and pulled out of the system cabinet.

FIG. 7 is a schematic diagram of charging and discharging of the power output discharge circuit illustrated in FIG. 4 when the power source module is plugged into and pulled out of the system cabinet. As illustrated in FIG. 7, a first row of Plug signal represent the power source module being plugged into and pulled out of the system cabinet. Plug at a high level represents a process in which the power source module is plugged into the system cabinet, and Plug at a low level represents a process in which the power source module is pulled out of the system cabinet. A second voltage signal represents voltage values of the capacitors C1 and C2, and as can be apparent, the voltages of the capacitors C1 and C2 can drop rapidly from 400V to 50 V in a period of time no more than 5 seconds after the power source module is pulled out of the system cabinet.

Thus with an implementation of the power output discharge circuit according to the invention, whether the power source module is pulled out of the system cabinet can be monitored in real time, and upon detecting the power source module being pulled out of the system cabinet, the output discharge module 130 can be started rapidly, and the voltage across the output port can be lowered below a safety voltage in a very short period of time. Furthermore due to the addition of the short-circuit connector, the short-circuit connector Short can make the short-circuit port Position and the control ground AGND shorted even if the triode Q2 fails, and at this time the gate of the IGBT Q1 can be forcibly pulled down to zero through the diode D3 so that the IGBT Q1 will stay in an OFF status all the time to thereby disable entirely the discharge function of the output discharge module 130 without any power consumption.

Figure 8:
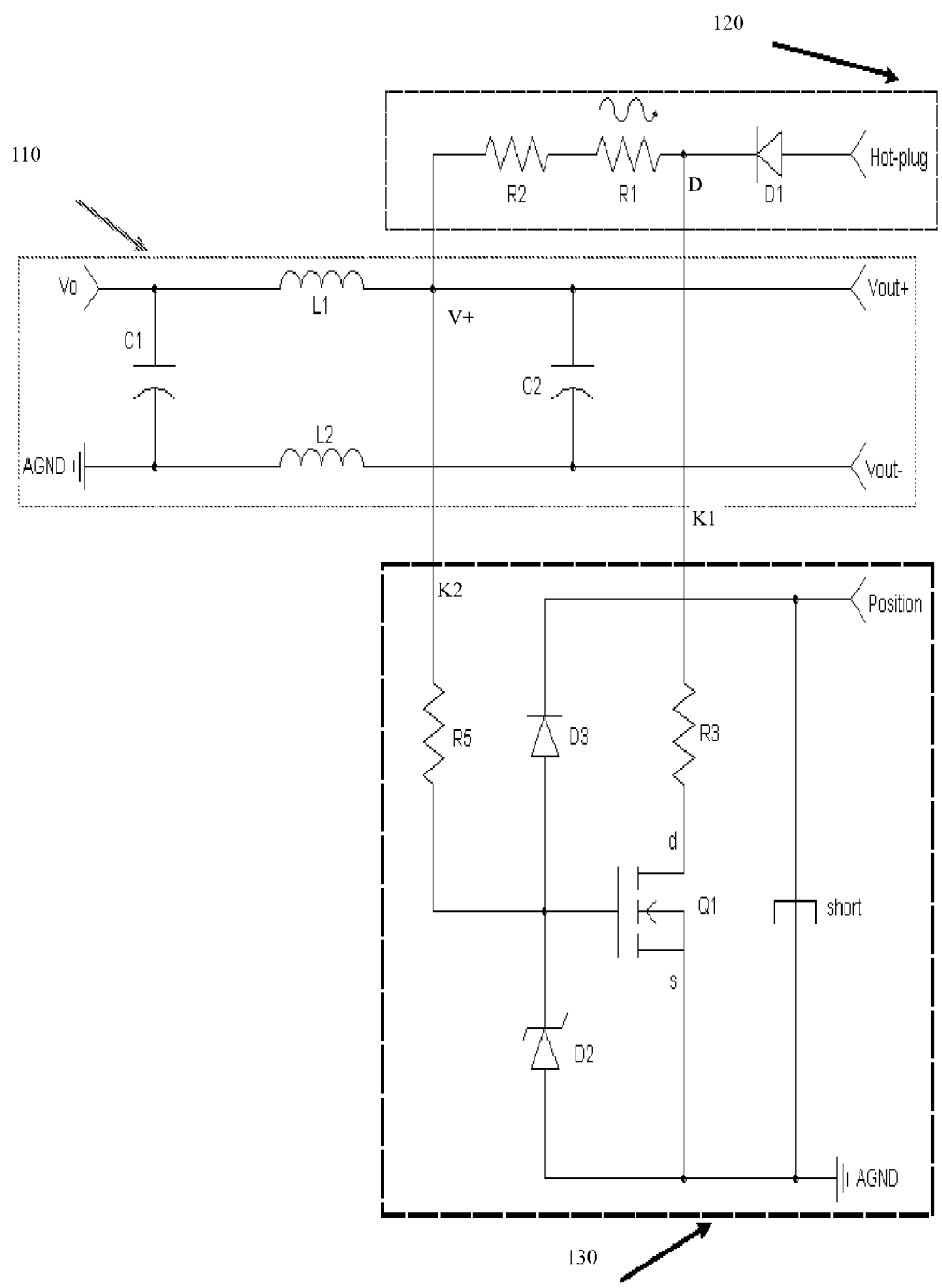
FIG. 8 is a schematic circuit diagram of a fourth embodiment of a power output discharge circuit according to the invention.

FIG. 8 is a schematic circuit diagram of a fourth embodiment of a power output discharge circuit according to the invention. As illustrated in FIG. 8, the output filter module 110 can include a capacitor C1, a capacitor C2, an inductor L1 and an inductor L2, where the capacitor C1 has the anode connected with an input voltage Vo, and the cathode connected with the ground AGND. The capacitor C2 has the anode connected with an output anode Vout+, and the cathode connected with an output cathode Vout−. The anode of the capacitor C1 is connected with the anode of the capacitor C2 through the inductor L1, and the cathode of the capacitor C1 is connected with the cathode of the capacitor C2 through the inductor L2.

The output charge module 120 can include a resistor R1, a resistor R2 and a diode D1, where the diode D1 has the anode connected with the hot plugging port Hot-plug, and the cathode connected with the positive output port V+ of the output filter module 110 through the resistor R1 and the resistor R2.

In this embodiment, when the power source module is pulled out of the system cabinet, the output discharge module 130 is configured to constitute a discharge loop together with the resistors R1-R2 of the output charge module 120 to discharge the capacitor C1 and the capacitor C2 in the output filter module 110.

The output discharge module 130 can include a resistor R3, a resistor R5, a diode D2, a diode D3, a switch tube Q1 and a short-circuit connector Short, where the resistor R3, the resistor R5 and the switch tube Q1 constitute a discharge switch unit, and the diodes D2 and D3 and the short-circuit connector Short constitute a discharge protection unit.

Particularly the switch tube Q1 has a first terminal connected with a first input port K1 of the discharge switch unit 131 through the resistor R3, a second terminal grounded, and a third terminal connected with a second input port K2 of the discharge switch unit 131 through the resistor R5. The switch tube Q1 can be a triode, a transistor or a metal oxide semiconductor tube. When the switch tube Q1 is a triode, the first terminal of the switch tube Q1 is an emitter of the triode, the second terminal of the switch tube Q1 is the collector of the triode, and the third terminal of the switch tube Q1 is the base of the triode; and when the switch tube Q1 is a transistor or a metal oxide semiconductor tube, the first terminal of the switch tube Q1 is the drain of the transistor or the metal oxide semiconductor tube, the second terminal of the switch tube Q1 is the source of the transistor or the metal oxide semiconductor tube, and the third terminal of the switch tube Q1 is the gate of the transistor or the metal oxide semiconductor tube.

In this embodiment, the switch tube Q1 is a transistor Q1, where the drain of the transistor Q1 is connected with the first input port K1 of the discharge switch unit 131 through the resistor R3. The first input port K1 of the discharge switch unit 131 is connected with a conducting port D of the output charge module 120. In this embodiment, the conducting port D of the output charge module 120 is the cathode of the diode D1. The transistor Q1 has the source grounded, and the gate connected with the cathode of the diode D2. The diode D2 has the anode grounded, and the cathode connected with the anode of the diode D3, the cathode of the diode D3 is connected with a short-circuit port, the short-circuit connector Short has a first terminal connected with the short-circuit port Position, and a second terminal grounded, and the base of the transistor Q1 is further connected with the second input port K2 of the discharge switch unit 131 through the resistor R5. The second input port K2 of the discharge switch unit 131 is connected with the positive output port V+ of the output filter module 110. For an operation principle thereof, reference can be made to the embodiments illustrated in FIG. 4 to FIG. 5. In light of the disclosure of the invention, those skilled in the art can appreciate the operation principle of this embodiment, and a repeated description thereof will be omitted here.

Thus with an implementation of the power output discharge circuit according to the invention, whether the power source module is pulled out of the system cabinet can be monitored in real time, and upon detecting the power source module being pulled out of the system cabinet, the output discharge module 130 can be started rapidly, and the voltage across the output port can be lowered below a safety voltage in a very short period of time. Furthermore due to the addition of the short-circuit connector, even if the triode fails, the discharge function of the output discharge module 130 can be ensured to be disabled entirely without any power consumption.

Figure 9:
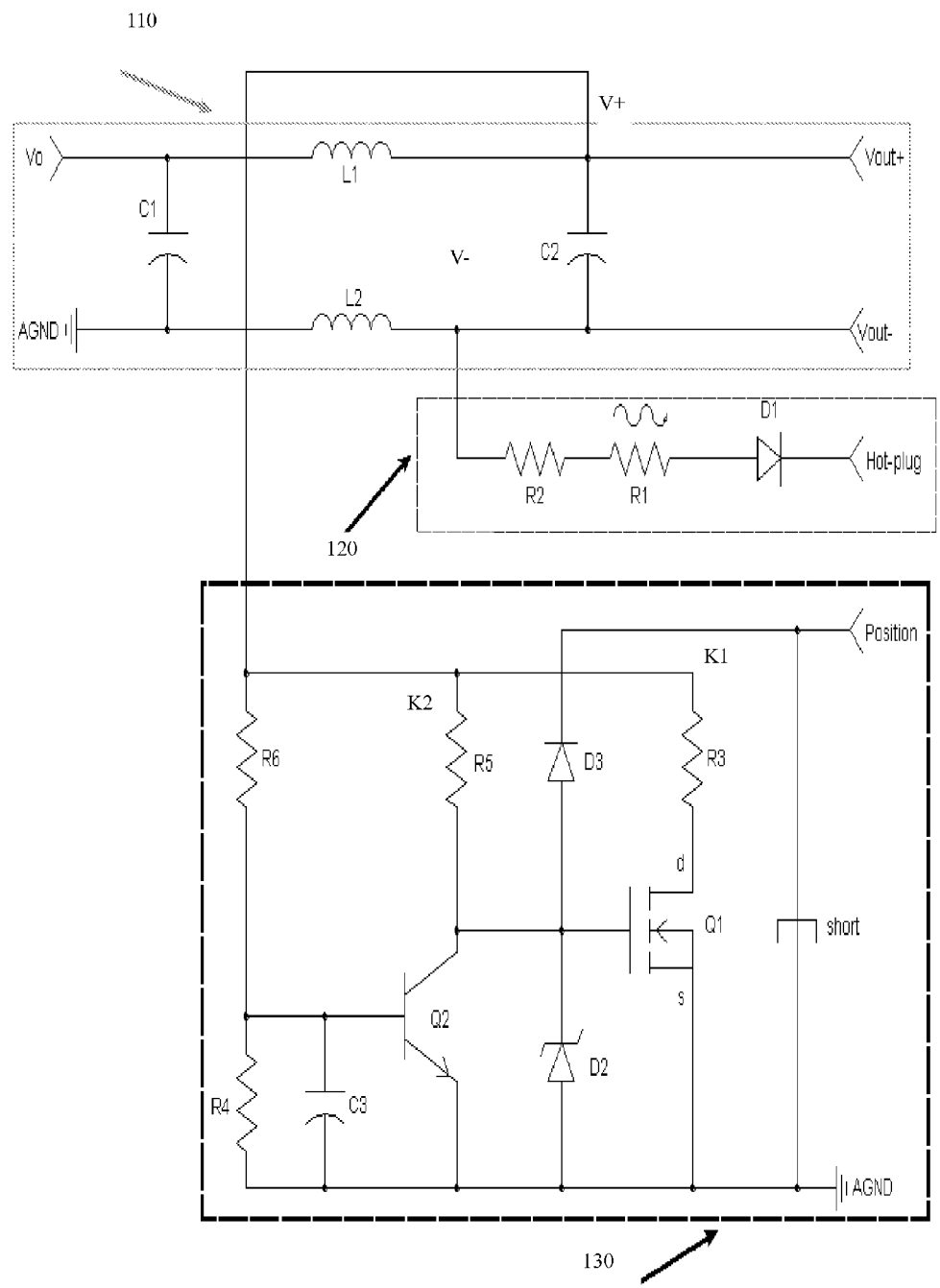
FIG. 9 is a schematic circuit diagram of a fifth embodiment of a power output discharge circuit according to the invention.

FIG. 9 is a schematic circuit diagram of a fifth embodiment of a power output discharge circuit according to the invention. As illustrated in FIG. 9, the output filter module 110 can include a capacitor C1, a capacitor C2, an inductor L1 and an inductor L2, where the capacitor C1 has the anode connected with an input voltage Vo, and the cathode connected with the ground AGND. The capacitor C2 has the anode connected with an output anode Vout+, and the cathode connected with an output cathode Vout−. The anode of the capacitor C1 is connected with the anode of the capacitor C2 through the inductor L1, and the cathode of the capacitor C1 is connected with the cathode of the capacitor C2 through the inductor L2.

The output charge module 120 can include a resistor R1, a resistor R2 and a diode D1, where the diode D1 has the cathode connected with the hot plugging port Hot-plug, and the anode connected with the negative output port V− of the output filter module 110 through the resistor R1 and the resistor R2.

In this embodiment, when the power source module is pulled out of the system cabinet, the output discharge module 130 is configured to constitute a discharge loop together with the resistors R1-R2 of the output charge module 120 to discharge the capacitor C1 and the capacitor C2 in the output filter module 110.

The output discharge module 130 includes a resistor R3, a resistor R4, a resistor R5, a resistor R6, a diode D2, a diode D3, a capacitor C3, a switch tube Q1, a switch tube Q2 and a short-circuit connector Short, where the resistor R3, the resistor R5 and the switch tube Q1 constitute a discharge switch unit, and the resistor R4, the resistor R6, the diode D2, the capacitor C3, the switch tube Q2, the diode D3 and the short-circuit connector Short constitute a discharge protection unit.

Particularly the switch tube Q1 has a first terminal connected with a first input port K1 of the discharge switch unit 131 through the resistor R3, a second terminal grounded, and a third terminal connected with a second input port K2 of the discharge switch unit 131 through the resistor R5. The switch tube Q1 can be a triode, a transistor or a metal oxide semiconductor tube. When the switch tube Q1 is a triode, the first terminal of the switch tube Q1 is an emitter of the triode, the second terminal of the switch tube Q1 is the collector of the triode, and the third terminal of the switch tube Q1 is the base of the triode; and when the switch tube Q1 is a transistor or a metal oxide semiconductor tube, the first terminal of the switch tube Q1 is the drain of the transistor or the metal oxide semiconductor tube, the second terminal of the switch tube Q1 is the source of the transistor or the metal oxide semiconductor tube, and the third terminal of the switch tube Q1 is the gate of the transistor or the metal oxide semiconductor tube.

Particularly the switch tube Q2 has a second terminal connected with the third terminal of the first switch tube, a first terminal grounded, and a third terminal connected with the anode of the capacitor C3, the cathode of the capacitor C3 is grounded, and the resistor R4 and the resistor R6 are connected in series between the hot plugging port Hot-plug and the ground GND. The third terminal of the switch tube Q2 is connected with the point where the resistor R4 and the resistor R6 are connected. The diode D2 has the anode grounded, and the cathode connected with the second terminal of the switch tube Q2. The switch tube Q2 is a triode, a transistor or a metal oxide semiconductor tube. When the switch tube Q2 is a triode, the first terminal of the switch tube Q2 is an emitter of the triode, the second terminal of the switch tube Q2 is the collector of the triode, and the third terminal of the switch tube Q2 is the base of the triode; and when the switch tube Q2 is a transistor or a metal oxide semiconductor tube, the first terminal of the switch tube Q2 is the drain of the transistor or the metal oxide semiconductor tube, the second terminal of the switch tube Q2 is the source of the transistor or the metal oxide semiconductor tube, and the third terminal of the switch tube Q2 is the gate of the transistor or the metal oxide semiconductor tube.

In this embodiment, the switch tube Q1 and the switch tube Q2 are a triode Q1 and a triode Q2, where the triode Q1 has the drain connected with the first input port K1 of the discharge switch unit 131 through the resistor R3, the collector grounded, and the base connected with the cathode of the diode D2 and the anode of the diode D3, where first input port K1 of the discharge switch unit 131 is connected with the positive output port V+ of the output filter module 110. The anode of the diode D2 is grounded. The diode D3 has the cathode connected with a short-circuit port Position, and the anode connected with the cathode of the diode D2. The short-circuit connector Short has a first terminal connected with the short-circuit port Position, and a second terminal grounded. The base of the triode Q1 is connected with the second input port K2 of the discharge switch unit 131 through the resistor R5. The second input port K2 of the discharge switch unit 131 is also connected with the positive output port V+ of the output filter module 110. The triode Q2 has the collector connected with the base of the triode Q1, the emitter grounded, and the base connected with the anode of the capacitor C3. The cathode of the capacitor C3 is grounded, the resistor R4 and the resistor R6 are connected in series between the hot plugging port Hot-plug and the ground AGND, and the base of the triode Q2 is connected with the point where the resistor R4 and the resistor R6 are connected. For an operation principle thereof, reference can be made to the embodiments illustrated in FIG. 4 to FIG. 5. In light of the disclosure of the invention, those skilled in the art can appreciate the operation principle of this embodiment, and a repeated description thereof will be omitted here.

Thus with an implementation of the power output discharge circuit according to the invention, whether the power source module is pulled out of the system cabinet can be monitored in real time, and upon detecting the power source module being pulled out of the system cabinet, the output discharge module 130 can be started rapidly, and the voltage across the output port can be lowered below a safety voltage in a very short period of time. Furthermore due to the addition of the short-circuit connector, even if the triode fails, the discharge function of the output discharge module can be ensured to be disabled entirely without any power consumption.

Although the invention has been described with respect to the particular embodiments thereof, those skilled in the art shall appreciate that various modifications and equivalent substitutions can further be made to the invention without departing from the scope of the invention. Accordingly the invention will not be limited to the disclosed particular embodiments but shall encompass all the implementations coming into the scope of the invention as defined in the appended claims.

The invention claimed is:

1. A power output discharge circuit, comprising:
   an output filter module configured to receive and filter an input voltage and to output the filtered output voltage to a load;
   an output charge module configured to charge the output filter module when a power source module is plugged into a system cabinet; and
   an output discharge module configured to cooperate with the output charge module to discharge the output filter module when the power source module is pulled out of the system cabinet.

2. The power output discharge circuit according to claim 1, wherein the output filter module comprises a first capacitor, a second capacitor, a first inductor and a second inductor, and wherein the first capacitor has the anode connected with an input voltage, and the cathode grounded, the second capacitor has the anode connected with an output anode, and the cathode connected with an output cathode, the anode of the first capacitor is connected with the anode of the second capacitor through the first inductor, and the cathode of the first capacitor is connected with the cathode of the second capacitor through the second inductor.

3. The power output discharge circuit according to claim 2, wherein the output charge module comprises a first resistor, and wherein the first resistor is connected between a hot plugging port and a positive output port of the output filter module, or the first resistor is connected between the hot plugging port and a negative output port of the output filter module.

4. The power output discharge circuit according to claim 3, wherein the output charge module further comprises a second resistor and a first diode, and wherein the first diode has the anode connected with the hot plugging port, and the cathode connected with the positive output port of the output filter module through the first resistor and the second resistor; or the first diode has the cathode connected with the hot plugging port, and the anode connected with the negative output port of the output filter module through the first resistor and the second resistor.

5. The power output discharge circuit according to claim 4, wherein when the power source module is pulled out of the system cabinet, the output discharge module is configured to constitute a discharge loop together with the first resistor and the second resistor of the output charge module to discharge the first capacitor and the second capacitor in the output filter module.

6. The power output discharge circuit according to claim 5, wherein the output discharge module comprises:
   a discharge switch unit configured to be turned on and to constitute a discharge loop together with the output charge module to discharge the output filter module when the power source module is pulled out of the system cabinet; and a discharge protection unit configured to protect the discharge switch unit when the discharge switch unit is turned on.

7. The power output discharge circuit according to claim 6, wherein the discharge switch unit comprises a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

8. The power output discharge circuit according to claim 4, wherein the output discharge module comprises:

a discharge switch unit configured to be turned on and to constitute a discharge loop together with the output charge module to discharge the output filter module when the power source module is pulled out of the system cabinet; and a discharge protection unit configured to protect the discharge switch unit when the discharge switch unit is turned on.

9. The power output discharge circuit according to claim 8, wherein the discharge switch unit comprises a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

10. The power output discharge circuit according to claim 3, wherein the output discharge module comprises:

a discharge switch unit configured to be turned on and to constitute a discharge loop together with the output charge module to discharge the output filter module when the power source module is pulled out of the system cabinet; and a discharge protection unit configured to protect the discharge switch unit when the discharge switch unit is turned on.

11. The power output discharge circuit according to claim 10, wherein the discharge switch unit comprises a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

12. The power output discharge circuit according to claim 2, wherein the output discharge module comprises:

a discharge switch unit configured to be turned on and to constitute a discharge loop together with the output charge module to discharge the output filter module when the power source module is pulled out of the system cabinet; and a discharge protection unit configured to protect the discharge switch unit when the discharge switch unit is turned on.

13. The power output discharge circuit according to claim 12, wherein the discharge switch unit comprises a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

14. The power output discharge circuit according to claim 13, wherein the first input port is connected with a conducting port of the output charge module, the second input port is connected with the positive output port of the output filter module, the discharge protection unit comprises a fourth resistor, a sixth resistor, a second diode, a third capacitor and a second switch tube, the second switch tube has a second terminal connected with the third terminal of the first switch tube, a first terminal grounded, and the third terminal connected with the anode of the third capacitor, the cathode of the third capacitor is grounded, the fourth resistor and the sixth resistor are connected in series between a hot plugging port and the ground, the third terminal of the second switch tube is connected with the point where the fourth resistor and the sixth resistor are connected, and the second diode has the anode grounded, and the cathode connected with the second terminal of the second switch tube; and the second switch tube is a triode, a transistor or a metal oxide semiconductor tube; and when the second switch tube is a triode, the first terminal of the second switch tube is an emitter of the triode, the second terminal of the second switch tube is the collector of the triode, and the third terminal of the second switch tube is the base of the triode; and when the second switch tube is a transistor or a metal oxide semiconductor tube, the first terminal of the second switch tube is the drain of the transistor or the metal oxide semiconductor tube, the second terminal of the second switch tube is the source of the transistor or the metal oxide semiconductor tube, and the third terminal of the second switch tube is the gate of the transistor or the metal oxide semiconductor tube.

15. The power output discharge circuit according to claim 1, wherein the output discharge module comprises:
a discharge switch unit configured to be turned on and to constitute a discharge loop together with the output charge module to discharge the output filter module when the power source module is pulled out of the system cabinet; and
a discharge protection unit configured to protect the discharge switch unit when the discharge switch unit is turned on.

16. The power output discharge circuit according to claim 15, wherein the discharge switch unit comprises a third resistor, a fifth resistor and a first switch tube, and wherein the first switch tube has a first terminal connected with a first input port of the discharge switch unit through the third resistor, a second terminal grounded, and a third terminal connected with a second input port of the discharge switch unit through the fifth resistor; and the first switch tube is a triode, a transistor or a metal oxide semiconductor tube; and when the first switch tube is a triode, the first terminal of the first switch tube is an emitter of the triode, the second terminal of the first switch tube is the collector of the triode, and the third terminal of the first switch tube is the base of the triode; and when the first switch tube is a transistor or a metal oxide semiconductor tube, the first terminal of the first switch tube is the drain of the transistor or the metal oxide semiconductor tube, the second terminal of the first switch tube is the source of the transistor or the metal oxide semiconductor tube, and the third terminal of the first switch tube is the gate of the transistor or the metal oxide semiconductor tube.

17. The power output discharge circuit according to claim 16, wherein the first input port is connected with a conducting port of the output charge module, the second input port is connected with the positive output port of the output filter module, the discharge protection unit comprises a fourth resistor, a sixth resistor, a second diode, a third capacitor and a second switch tube, the second switch tube has a second terminal connected with the third terminal of the first switch tube, a first terminal grounded, and the third terminal connected with the anode of the third capacitor, the cathode of the third capacitor is grounded, the fourth resistor and the sixth resistor are connected in series between a hot plugging port and the ground, the third terminal of the second switch tube is connected with the point where the fourth resistor and the sixth resistor are connected, and the second diode has the anode grounded, and the cathode connected with the second terminal of the second switch tube; and the second switch tube is a triode, a transistor or a metal oxide semiconductor tube; and when the second switch tube is a triode, the first terminal of the second switch tube is an emitter of the triode, the second terminal of the second switch tube is the collector of the triode, and the third terminal of the second switch tube is the base of the triode; and when the second switch tube is a transistor or a metal oxide semiconductor tube, the first terminal of the second switch tube is the drain of the transistor or the metal oxide semiconductor tube, the second terminal of the second switch tube is the source of the transistor or the metal oxide semiconductor tube, and the third terminal of the second switch tube is the gate of the transistor or the metal oxide semiconductor tube.

18. The power output discharge circuit according to claim 17, wherein the discharge protection unit further comprises a third diode and a short-circuit connector, and wherein the third diode has the anode connected with the cathode of the second diode and the third terminal of the first switch tube, and the cathode connected with a short-circuit port, and the short-circuit connector has a first terminal connected with the short-circuit port, and a second terminal grounded.

19. The power output discharge circuit according to claim 16, wherein the first input port is connected with a conducting port of the output charge module, the second input port is connected with the positive output port of the output filter module, the discharge protection unit comprises a second diode, a third diode and a short-circuit connector, and wherein the second diode has the anode grounded, and the cathode connected with the third terminal of the first switch tube and the anode of the third diode, the cathode of the third diode is connected with a short-circuit port, and the short-circuit connector has a first terminal connected with the short-circuit port, and a second terminal grounded.

20. The power output discharge circuit according to claim 16, wherein both the first input port and the second input port of the discharge switch unit are connected with the positive output port of the output filter module, the discharge protection unit comprises a sixth resistor, a fourth resistor, a second diode, a third diode, a third capacitor and a second switch tube, the second switch tube has a second terminal connected with the third terminal of the first switch tube, a first terminal grounded, and a third terminal connected with the anode of the third capacitor, the cathode of the third capacitor is grounded, the sixth resistor and the fourth resistor are connected in series between the positive output port of the output filter module and the ground, the third terminal of the second switch tube is connected with the point where the sixth resistor and the fourth resistor are connected, the second diode has the anode grounded, and the cathode connected with the third terminal of the first switch tube and the anode of the third diode, and the cathode of the third diode is connected with the a short-circuit port.

* * * * *